US011658711B2

(12) United States Patent
Gao et al.

(10) Patent No.: US 11,658,711 B2
(45) Date of Patent: May 23, 2023

(54) SKYWAVE LARGE-SCALE MIMO COMMUNICATION METHOD, MODEL, AND SYSTEM

(71) Applicant: SOUTHEAST UNIVERSITY, Nanjing (CN)

(72) Inventors: Xiqi Gao, Nanjing (CN); Xianglong Yu, Nanjing (CN); Anan Lu, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 17/597,778

(22) PCT Filed: Dec. 21, 2020

(86) PCT No.: PCT/CN2020/137876
§ 371 (c)(1),
(2) Date: Jan. 22, 2022

(87) PCT Pub. No.: WO2022/104993
PCT Pub. Date: May 27, 2022

(65) Prior Publication Data
US 2022/0376750 A1 Nov. 24, 2022

(30) Foreign Application Priority Data
Nov. 19, 2020 (CN) .......................... 202011300870.2

(51) Int. Cl.
*H04B 7/04* (2017.01)
*H04B 7/0456* (2017.01)
(Continued)

(52) U.S. Cl.
CPC ............. *H04B 7/0456* (2013.01); *H04B 7/22* (2013.01); *H04B 17/391* (2015.01); *H04L 27/2602* (2013.01)

(58) Field of Classification Search
CPC ...... H04B 7/0456; H04B 17/391; H04B 7/22; H04L 27/2602
See application file for complete search history.

(56) References Cited

U.S. PATENT DOCUMENTS

2017/0230100 A1* 8/2017 Babich .................. H04W 28/20

* cited by examiner

*Primary Examiner* — Curtis B Odom
(74) *Attorney, Agent, or Firm* — PROI Intellectual Property US; Klaus Michael Schmid

(57) ABSTRACT

The present disclosure relates to a skywave large-scale MIMO communication method, model, and system. A skywave communication base station in a short waveband is constructed using a large-scale antenna array, wherein skywave large-scale MIMO communication is carried out between the skywave communication base station and a user terminal in a coverage area by ionospheric reflection. The skywave communication base station determines a spacing of the large-scale antenna array according to a maximum operating frequency, and communicates with the user terminal based on a TDD communication mode, wherein a skywave large-scale MIMO signal is transmitted based on an OFDM modulation mode or a power efficiency improvement modulation mode. The skywave communication base station selects a communication carrier frequency within a short waveband range according to a real-time ionospheric channel characteristic, and adaptively selects an OFDM modulation parameter and a signal frame structure.

26 Claims, 6 Drawing Sheets

(51) Int. Cl.
*H04B 17/391* (2015.01)
*H04B 7/22* (2006.01)
*H04L 27/26* (2006.01)

SKYWAVE LARGE-SCALE MIMO COMMUNICATION METHOD, MODEL, AND SYSTEM

TECHNICAL FIELD

The present disclosure relates to the technical field of skywave communications, and in particular, relates to a skywave communication method and system employing short-wavelength band large-scale multiple-input and multiple-output (MIMO) antenna arrays.

BACKGROUND

For global coverage of wireless communication in the future, satellite communication is considered as an attractive candidate technique, and has become a research hotspot in academia and industry. Over-the-horizon communication of thousands of kilometers may be achieved by using sky wave communication of short waveband, such that the future wireless communication system implements global coverage. Skywave communication systems do not require expensive infrastructure, and occupy only very limited spectral resources and rely on time-varying multi-path ionospheric channels for transmission. The skywave communication system generally has an extremely low system rate and is less competitive against the satellite communication. In recent years, for effective improvements of the rate performance and reliability of the skywave communication system, the MIMO technology is introduced into the short waveband sky wave communication. However, in most cases, point-to-point MIMO is employed, and only a small improvement is made to the system rate performance.

In large-scale MIMO communication, a large number of antenna units are configured at a base station, such that the base station is capable of providing services a large number of terminal users on the same time-frequency resource. In this way, the spectral efficiency, the power efficiency, the transmission rate and the reliability of the system are obviously improved. Large-scale MIMO has become one of the key technologies for the fifth generation (5G) mobile communication systems, and is widely researched in sub-6G frequency band, millimeter wave/terahertz frequency band, and optical band. The present disclosure provides a skywave communication method and system with a large-scale MIMO antenna array of a short wave band configured at the base station.

SUMMARY

Technical problem: In view of the above defect in the related art, the present disclosure provides a skywave large-scale MIMO communication method, model and system, such that spectral and energy efficiencies, transmission bandwidth and distance, and rate and terminal capacity in of skywave communication are greatly improved.

A skywave large-scale MIMO communication method is provided. The method includes: a skywave communication base station in a short waveband using a large-scale antenna array, skywave large-scale MIMO communication being carried out between the skywave communication base station and a user terminal within a coverage area by ionospheric reflection; determining, by the skywave communication base station, a spacing of the large-scale antenna array according to a maximum operating frequency, and communicating with the user terminal based on a time division duplex (TDD) communication mode, a skywave large-scale MIMO signal being transmitted based on an orthogonal frequency division multiplexing (OFDM) modulation mode or a power efficiency improvement modulation mode; selecting a communication carrier frequency within a short waveband range according to a real-time ionospheric channel characteristic, and adaptively selecting an OFDM modulation parameter and a signal frame structure; and scheduling, by the skywave communication base station, users within the coverage area according to statistical channel information of various user terminals to form a space division user group, wherein skywave large-scale MIMO signal transmission is carried out between different user groups and the skywave communication base station using different communication time-frequency resources, and skywave large-scale MIMO signal transmission is carried out between user terminals in the same user group and the skywave communication base station using the same time-frequency resource.

The large-scale antenna array of the skywave communication base station is a linear array formed of antennas in the short waveband.

The spacing of the large-scale antenna array of the skywave communication base station is a half wavelength corresponding to the maximum operating frequency or an approximately maximum operating frequency.

The short waveband range is 1.6 MHz to 30 MHz.

The communication carrier frequency is determined by a frequency selection system of the skywave communication base station and varies with season, day-night, weather, and the like external factors, and the skywave communication base station implements a frequency selection function by passive monitoring and active detection; wherein in the active detection, the skywave communication base station transmits a dedicated channel detection signal, implements dynamic frequency selection and interference detection using a received short-wave full-band signal, and selects a frequency point with less interference as a current operating carrier.

In the skywave TDD communication mode, uplink and downlink transmissions are carried out using the same frequency band, and time for the uplink and downlink transmissions within one frequency band is adjusted according to actual needs.

Transmitting the skywave large-scale MIMO signal based on the OFDM modulation mode or the power efficiency improvement modulation mode includes: transmitting a skywave large-scale MIMO downlink signal using the OFDM modulation mode, and transmitting a skywave large-scale MIMO uplink signal based on the OFDM modulation mode or the power efficiency improvement modulation mode. The OFDM includes discrete Fourier transform OFDM.

In the skywave large-scale MIMO, the statistical channel information of various user terminals used for scheduling the users is statistical channel information of OFDM sub-carrier domains used by the various user terminals.

The time-frequency resources used for the skywave large-scale MIMO communication are OFDM modulation symbols and OFDM modulated sub-carriers.

Carrying out the skywave large-scale MIMO signal transmission between the user terminals in the same user group and the skywave communication base station using the same time-frequency resource includes: transmitting and receiving, by the user terminals in the same user group, a signal on the same time-frequency resource; calculating, by the skywave communication base station, uplink receivers and downlink pre-coders of the user terminals based on channel information of the user terminals in the space division user group to carry out signal reception and transmission.

The uplink receiver and the downlink pre-coder are calculated based on a minimum mean square error criterion or based on a polynomial expansion or based on a deterministic-equivalent polynomial expansion.

The skywave large-scale MIMO communication includes:

a. synchronization: the skywave communication base station broadcasts a downlink synchronization signal, and the user terminals establish and maintain synchronization with the skywave communication base station using a received signal;

b. channel detection: the user terminals in the skywave communication each transmit an uplink detection signal, and the skywave communication base station estimates channel status information of each of the user terminals based on the received detection signal;

c. space division grouping: the skywave communication base station schedules the users based on the acquired user channel status information, and schedules several user groups that are in communication on the same time-frequency resource simultaneously within the coverage area;

d. uplink transmission: the user terminals within the same user group simultaneously transmit a pilot signal and a data signal to the skywave communication base station; and the skywave communication base station estimates uplink instantaneous channel information or statistical channel information based on the uplink detection signal or the pilot signal, calculates uplink reception and processing vectors of the user terminals based on a minimum mean square error criterion or based on a polynomial expansion or based on a deterministic-equivalent polynomial expansion, and performs uplink signal reception and processing; and e. downlink transmission: the skywave communication base station acquires a downlink channel according to channel reciprocity of a TDD system, and calculates downlink pre-coding vectors of the user terminals within the user group based on the minimum mean square error criterion or based on the polynomial expansion or based on the deterministic-equivalent polynomial expansion, and transmits a user pilot signal and a data signal in a digital pre-coding domain; and the user terminal implements downlink channel estimation, data signal demodulation, decoding, and the like operation using the acquired downlink pilot signal, and restores a user signal transmitted by the base station.

A beam-domain statistical model of a skywave large-scale MIMO broadband communication channel applicable to the method according to the present disclosure is provided, wherein a skywave communication base station generates the beam-domain statistical model for the skywave large-scale MIMO broadband communication channel; and the skywave communication base station selects a group of spatial angle sampling lattices, and forms beam-domain statistical characterization of OFDM transmit sub-carrier-domain channels using corresponding array direction vectors; wherein each of the array direction vectors corresponds to one beam, and the number of array direction vectors or beams is greater than or equal to the number of antennas in an array; a matrix constituted by the array direction vectors implements conversion between a skywave large-scale MIMO broadband communication antenna-domain channel and a skywave large-scale MIMO broadband communication beam-domain channel, and varies along different signal frequencies or sub-carriers; and statistical information or energy of the skywave large-scale MIMO broadband communication beam-domain channel is the same on all the signal frequencies or sub-carriers.

The selected group of spatial angle sampling lattices are uniform sampling lattices of cosines of angles.

The array direction vector is determined by the skywave communication base station according to a current signal frequency or sub-carrier index and an antenna spacing.

With respect to the skywave large-scale MIMO broadband communication beam-domain statistical characterization, the matrix constituted by the array direction vectors is multiplied by a random vector with elements independent of each other to characterize the skywave large-scale MIMO broadband communication antenna-domain channel; wherein the random vector is a vector of the skywave large-scale MIMO broadband communication beam-domain channel.

A skywave large-scale MIMO communication system applicable to the method according to the present disclosure is provided. The system includes: a skywave communication base station and a large number of user terminals; wherein the skywave communication base station configures a short waveband large-scale antenna array to carry out skywave large-scale MIMO communication between the skywave communication base station and a user terminal within a same coverage area by ionospheric reflection; the skywave communication base station determines a spacing of the large-scale antenna array according to a maximum operating frequency, and communicates with the user terminal based on a TDD communication mode, a skywave large-scale MIMO signal being transmitted based on an OFDM modulation mode or a power efficiency improvement modulation mode; the skywave communication base station selects a communication carrier frequency within a short waveband range according to a real-time ionospheric channel characteristic, and adaptively selects an OFDM modulation parameter and a signal frame structure; and the skywave communication base station schedules users within the coverage area according to statistical channel information of various user terminals to form a space division user group, wherein skywave large-scale MIMO signal transmission is carried out between different user groups and the skywave communication base station using different communication time-frequency resources, and skywave large-scale MIMO signal transmission is carried out between user terminals in the same user group and the skywave communication base station using the same time-frequency resource.

The skywave communication base station includes a frequency selection unit, a baseband processing unit, a radio frequency unit, a large-scale antenna array; wherein the baseband processing unit includes:

an analog-to-digital (A/D) conversion and digital down conversion module, configured for skywave large-scale MIMO uplink transmission; wherein the A/D conversion module is configured to perform radio frequency sampling in the whole short waveband, and convert a broadband analog signal to a digital signal; wherein the digital down conversion module is configured to down convert the digital signal output by the A/D conversion module to a baseband by digital processing to acquire a digital baseband signal;

a digital baseband processing and control module, configured to, in the skywave large-scale MIMO uplink transmission, perform OFDM demodulation, joint receive multiple user received signals, and restore a transmit signal of each of the user terminals; and perform multiple user pre-coding transmission, generate the transmit signal of each of the user terminals, and perform OFDM modulation; wherein the control module is configured to perform space division user scheduling to form a space division user group and perform other controls in the communication; and a digital up conversion and digital-to-analog (D/A) conversion module, configured for skywave large-scale MIMO downlink transmission; wherein the digital up conversion module is configured to modulate the baseband signal to a radio frequency by digital processing; and the D/A conversion module is configured to convert a digital transmit signal generated by the up conversion module to an analog signal; wherein the frequency selection unit of the skywave communication base station implements frequency selection by passive monitoring and active detection; wherein in the active detection, a dedicated channel detection signal is transmitted, dynamic frequency selection and interference detection are implemented using a received short-wave full-band signal, and a frequency point with less interference is selected as a current operating carrier; and the large-scale antenna array of the skywave communication base station is an antenna array constituted by short waveband antenna units, wherein a spacing of the antenna units is a half wavelength corresponding to the maximum operating frequency, and the antenna array is in a linear form or a form facilitating deployment of the antenna units.

The user terminal includes a baseband processing unit, a radio frequency unit, and an antenna; wherein the baseband processing unit includes:

an A/D conversion and digital down conversion module, configured for skywave large-scale MIMO downlink transmission; wherein the A/D conversion module is configured to convert a received analog signal to a digital signal; and the digital down conversion module is configured to down convert the digital signal output by the A/D conversion module to a baseband by digital processing to acquire a digital baseband signal;

a digital baseband processing and control module, configured to implement downlink channel estimation, perform OFDM demodulation, and restore a data signal transmitted by the base station in the skywave large-scale MIMO downlink transmission; and generate a digital transmit signal and perform OFDM modulation in the skywave large-scale MIMO uplink transmission; and a digital up conversion module and D/A conversion module, configured for the skywave large-scale MIMO uplink transmission; wherein the D/A conversion module is configured to convert a digital signal to an analog signal; and the digital up conversion module is configured to modulate a digital baseband signal to a radio frequency by digital processing.

The short waveband range is generally 1.6 MHz to 30 MHz.

In the skywave TDD communication mode, uplink and downlink transmissions are carried out using the same frequency band, and time for the uplink and downlink transmissions within one frequency band is adjusted according to actual needs.

Transmitting the skywave large-scale MIMO signal based on the OFDM modulation mode or the power efficiency improvement modulation mode includes: transmitting a skywave large-scale MIMO downlink signal using the OFDM modulation mode, and transmitting a skywave large-scale MIMO uplink signal based on the OFDM modulation mode or the power efficiency improvement modulation mode. The OFDM includes discrete Fourier transform OFDM.

The statistical channel information of the various user terminals used for scheduling the users is statistical channel information of OFDM sub-carrier domains used by the various user terminals.

The time-frequency resources used for the skywave large-scale MIMO communication are OFDM modulation symbols and OFDM modulated sub-carriers.

Carrying out the skywave large-scale MIMO signal transmission between the user terminals in the same user group and the skywave communication base station using the same time-frequency resource includes: transmitting and receiving, by the user terminals in the same user group, a signal on the same time-frequency resource; calculating, by the skywave communication base station, uplink receivers and downlink pre-coders of the user terminals based on channel information of the user terminals in the space division user group to carry out signal reception and transmission.

The uplink receiver and the downlink pre-coder are calculated based on a minimum mean square error criterion or based on a polynomial expansion or based on a deterministic-equivalent polynomial expansion; the uplink receiver includes a minimum mean square error (MMSE) receiver or a polynomial expansion (PE) receiver or a low-complexity PE receiver; and the downlink pre-coder includes a minimum mean square error pre-coder or a polynomial expansion pre-coder or a low-complexity polynomial expansion pre-coder.

Beneficial effects: Compared with the related art, the present disclosure has the following advantages:

The skywave large-scale MIMO communication method and system according to the present disclosure are capable of greatly improving spectral and power efficiencies, transmission bandwidth and distance, and rate and terminal capacity in of skywave communication. Based on the skywave channel characteristic, by dynamic frequency selection and adaptive OFDM adjustment, and selection of power efficiency improvement parameter and signal frame structure, system performance is sufficiently improved. Based on the characteristic of large array span, a more accurate broadband channel model with direction vectors correlated with the signal frequency is established. An oversampled fine beam-domain channel statistical model is established, such that the statistical channel information is more sufficient and accurate.

BRIEF DESCRIPTION OF THE DRAWINGS

For clearer descriptions of the technical solutions in the embodiments of the present disclosure or in the related art, hereinafter, drawings that are to be referred for description of the embodiments or the related art are briefly described. Apparently, the drawings described hereinafter merely illustrate some embodiments of the present disclosure. Persons of ordinary skill in the art may also derive other drawings based on the drawings described herein without any creative effort.

DETAILED DESCRIPTION

The technical solutions according to the present disclosure are described in detail with reference to specific embodiments. It should be understood that the specific embodiments hereinafter are merely used to illustrate the present disclosure instead of limiting the scope of the present disclosure. The method according to the present disclosure is mainly applicable to a skywave large-scale MIMO communication system in which a base station equipped with a large-scale antenna array to simultaneously provide services to a large number of user terminals with a single antenna. Hereinafter, with reference to a specific communication system, implementations of a skywave large-scale MIMO communication method and system according to the present disclosure are described in detail. It should be noted that the method according to the present disclosure is not only applicable to a specific system model illustrated in examples hereinafter, but also applicable to system models with other configurations.

Figure 1:
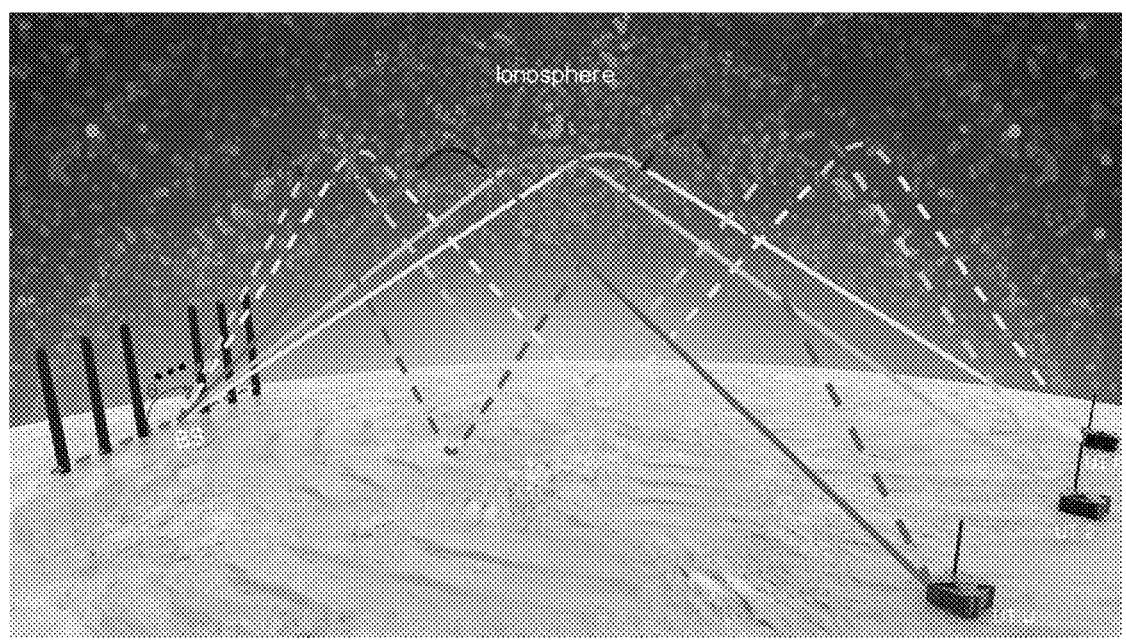
FIG. 1 is a schematic diagram of skywave large-scale MIMO communication.

As illustrated in FIG. 1, a schematic diagram of skywave large-scale MIMO communication according to an embodiment of the present disclosure is given. A base station is equipped with a large-scale antenna array in a short waveband. By ionospheric reflection, within a coverage area of the base station, the base station communicates with a large number of user terminals.

Figure 2:
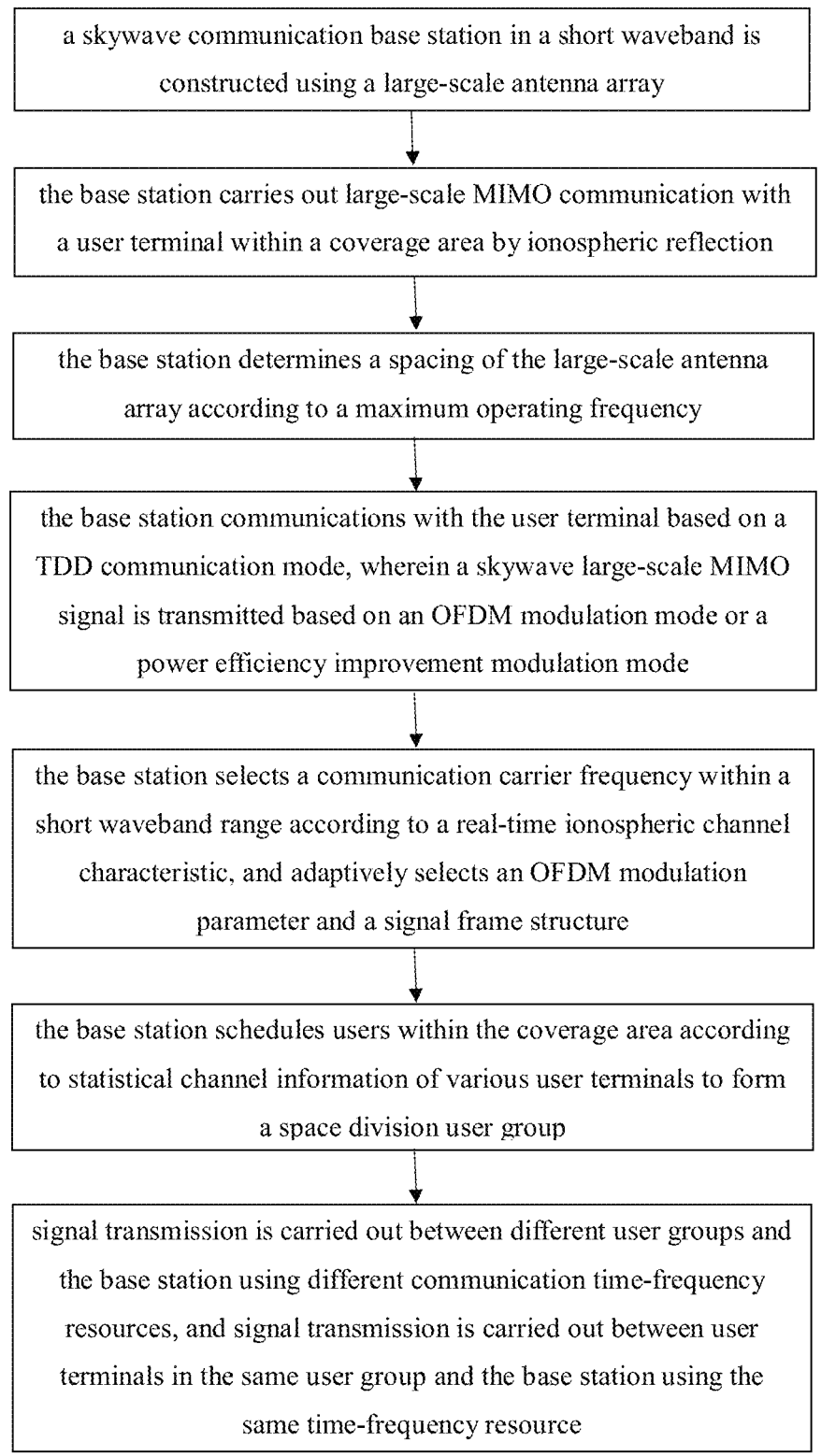
FIG. 2 is a schematic flowchart of a skywave large-scale MIMO communication method.

As illustrated in FIG. 2, a skywave large-scale MIMO communication method according to an embodiment of the present disclosure includes: constructing a skywave communication base station in a short waveband using a large-scale antenna array, skywave large-scale MIMO communication being carried out between the skywave communication base station and a user terminal within a coverage area by ionospheric reflection; determining, by the skywave communication base station, a spacing of the large-scale antenna array according to a maximum operating frequency, communicating with the user terminal based on a TDD communication mode, a skywave large-scale MIMO signal being transmitted based on an OFDM modulation mode or a power efficiency improvement modulation mode; selecting a communication carrier frequency within a short waveband range according to a real-time ionospheric channel characteristic, and adaptively selecting an OFDM modulation parameter and a signal frame structure; and scheduling, by the skywave communication base station, users within the coverage area according to statistical channel information of various user terminals to form a space division user group, wherein skywave large-scale MIMO signal transmission is carried out between different user groups and the skywave communication base station using different communication time-frequency resources, and skywave large-scale MIMO signal transmission is carried out between user terminals in the same user group and the skywave communication base station using the same time-frequency resource.

Figure 3:
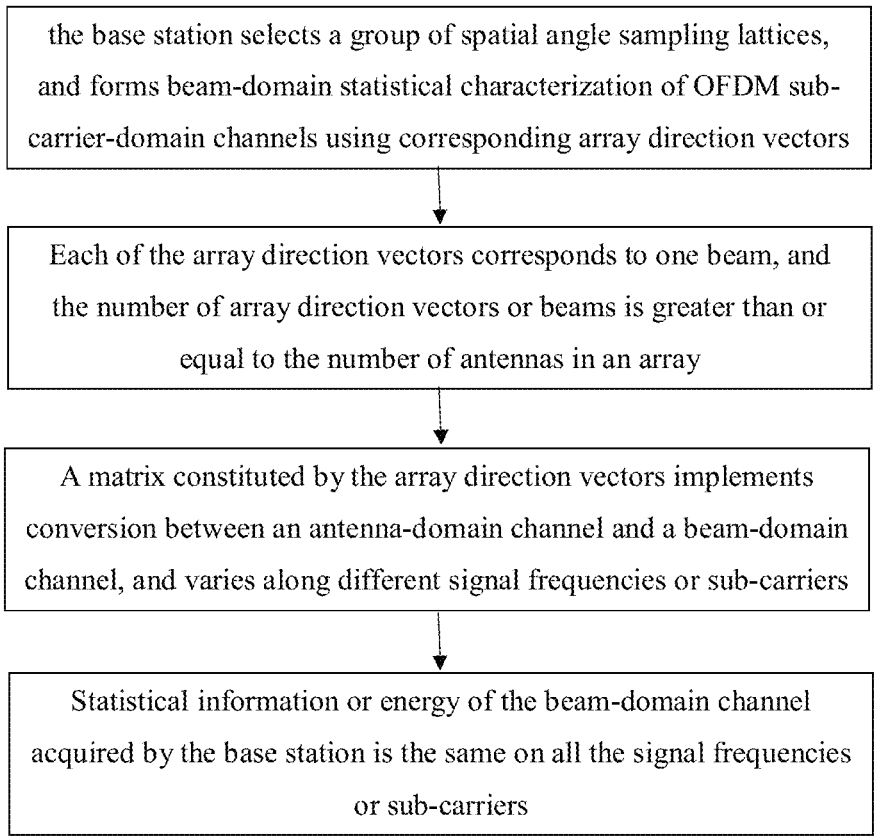
FIG. 3 is a schematic diagram of a beam-domain statistical model of a skywave large-scale MIMO broadband communication channel.

As illustrated in FIG. 3, a beam-domain statistical model of a skywave large-scale MIMO broadband communication channel according to an embodiment of the present disclosure is provided. A skywave communication base station generates the beam-domain statistical model for the skywave large-scale MIMO broadband communication channel; and the skywave communication base station selects a group of spatial angle sampling lattices, and forms beam-domain statistical characterization of OFDM transmit sub-carrier-domain channels using corresponding array direction vectors; wherein each of the array direction vectors corresponds to one beam, and the number of array direction vectors or beams is greater than or equal to the number of antennas in an array; a matrix constituted by the array direction vectors implements conversion between a skywave large-scale MIMO broadband communication antenna-domain channel and a skywave large-scale MIMO broadband communication beam-domain channel, and varies along different signal frequencies or sub-carriers; and statistical information or energy of the skywave large-scale MIMO broadband communication beam-domain channel is the same on all the signal frequencies or sub-carriers.

I. System Configuration

Figure 4:
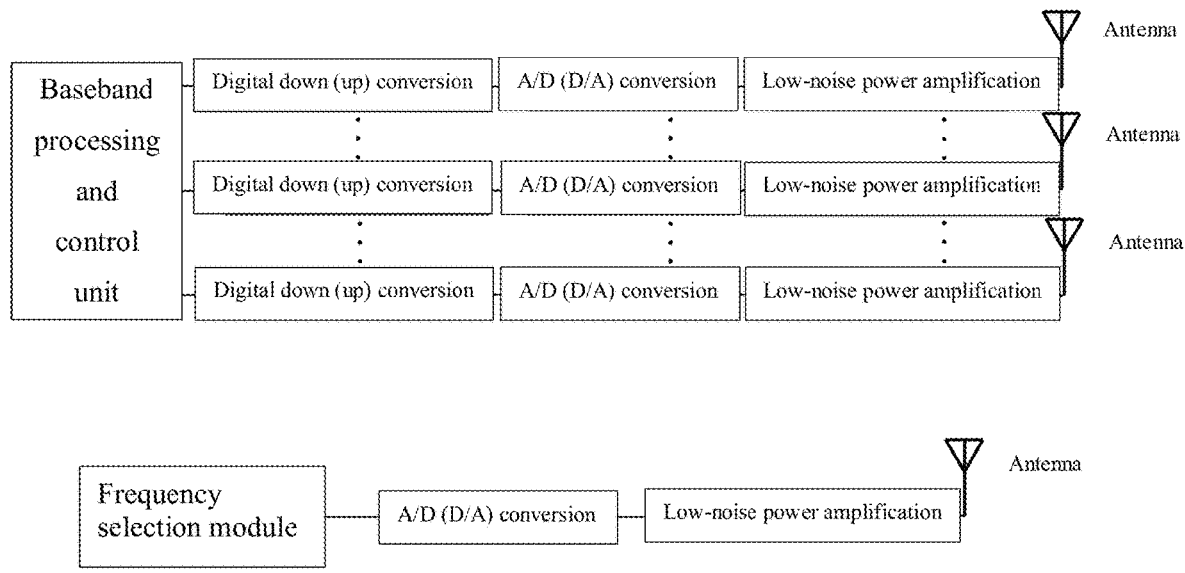
FIG. 4 is a schematic diagram of functional modules of a skywave communication base station in a skywave large-scale MIMO communication system.

FIG. 4 is a diagram of functional modules of a skywave communication base station in a skywave large-scale MIMO communication system according to an embodiment of the present disclosure. As illustrated in FIG. 4, the skywave communication base station includes a frequency selection unit, a baseband processing unit, a radio frequency unit, and a large-scale antenna array. Specifically, the baseband processing unit includes:

an A/D conversion and digital down conversion module, configured for skywave large-scale MIMO uplink transmission; wherein the A/D conversion module is configured to perform radio frequency sampling in the whole short waveband, and convert a broadband analog signal to a digital signal; wherein the digital down conversion module is configured to down convert the digital signal output by the A/D conversion module to a baseband by digital processing to acquire a digital baseband signal;

a digital baseband processing and control module, configured to, in the skywave large-scale MIMO uplink transmission, perform OFDM demodulation, joint receive multiple user received signals, and restore a transmit signal of each of the user terminals; and perform multiple user pre-coding transmission, generate the transmit signal of each of the user terminals, and perform OFDM modulation; wherein the control module is configured to perform space division user scheduling to form a space division user group and perform other controls in the communication;

a digital up conversion and D/A conversion module, configured for skywave large-scale MIMO downlink transmission; wherein the digital up conversion module is configured to modulate the baseband signal to a radio frequency by digital processing; and the D/A conversion module is configured to convert a digital transmit signal generated by the up conversion module to an analog signal;

The frequency selection unit of the skywave communication base station performs frequency selection by passive monitoring and active detection. Particularly, in the active detection, a dedicated channel detection signal is transmitted, dynamic frequency selection and interference detection are implemented using a received short-wave full-band signal, and a frequency point with less interference is generally selected as a current operating carrier.

The large-scale antenna array of the skywave communication base station is an antenna array constituted by short waveband antenna units, wherein the number of antenna units is several tens or several hundreds, a spacing of the antenna units determined according to the maximum operating frequency, and the antenna array may be in a linear form or a form facilitating deployment of the antenna units.

Figure 5:
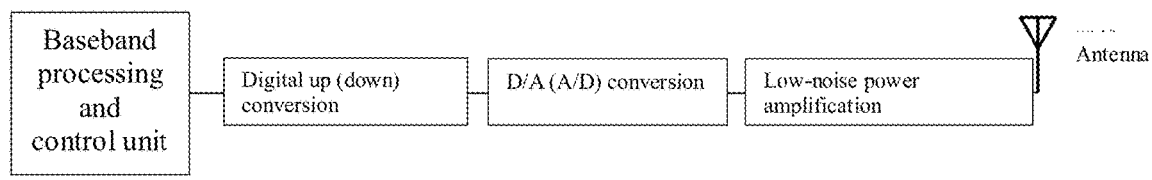
FIG. 5 is a schematic diagram of a schematic diagram of functional modules of a user terminal in a skywave large-scale MIMO communication system.

FIG. 5 is a diagram of functional modules of a user terminal in a skywave large-scale MIMO communication system according to an embodiment of the present disclosure. As illustrated in FIG. 5, the user terminal includes a baseband processing unit, a radio frequency unit, and an antenna. Specifically, the baseband processing unit includes:

an A/D conversion and digital down conversion module, configured for the skywave large-scale MIMO downlink transmission; wherein the A/D conversion module is configured to convert a received analog signal to a digital signal; and the digital down conversion module is configured to down convert the digital signal output by the A/D conversion module to a baseband by digital processing to acquire a digital baseband signal;

a digital baseband processing and control module, configured to implement downlink channel estimation, perform OFDM demodulation, and restore a data signal transmitted by the base station in the skywave large-scale MIMO downlink transmission; and generate a digital transmit signal and perform OFDM modulation in the skywave large-scale MIMO uplink transmission; and a digital up conversion and D/A conversion module, configured for the skywave large-scale MIMO uplink transmission; wherein the D/A conversion module is configured to convert a digital signal to an analog signal; and the digital up conversion module is configured to modulate a digital baseband signal to a radio frequency by digital processing.

Considering that the skywave communication base station is equipped with a one-dimensional uniform linear array with a spacing of d, the number M of antennas is generally several tens or several hundreds, which provide services for U user terminals each equipped with a single antenna. A system carrier is selected as $f_c$ within a short waveband (1.6 to 30 MHz), which needs to be determined by a frequency selection system of the skywave communication base station, and varies with external factors such as season, day-night, weather, and the like. $f_o$ is defined as the maximum operating frequency of the system, and it is defined that $$d = \frac{\lambda_o}{2},$$

wherein $$\lambda_o = \frac{c}{f_0},$$

wherein c represents a light speed. The skywave communication base station communicates with the user terminals based on the skywave TDD communication mode, uplink and downlink transmissions are carried out using the same frequency hand, the uplink and downlink transmissions are intermittently carried out in different time segments, and time for the uplink and downlink transmissions within one frequency band is adjusted according to actual needs.

II. Signal Model

Skywave large-scale MIMO communication is carried out between the skywave communication base station and the user terminals within the coverage area by ionospheric reflection. The ionosphere may be divided into a D layer, an E layer, and an F layer. The E layer and the F layer are mainly responsible for reflection of skywave signals to achieve large-range communication, and the D layer is mainly responsible for absorbing energy of the skywave signals to attenuate transmit signals. Similar to terrestrial cellular radio channels, transmission of the skywave signals is also subjected to multi-path prorogation. Particularly, transmit signals arrive at the receiver by a single reflection or multiple reflections by the E layer and/or the F layer.

$x_u^{ul}(t)$ is defined as an uplink transmit analog baseband complex signal of a user terminal u. A receive analog baseband complex signal of the skywave communication base station may be represented as $$y^{ul}(t) = \sum_{u=1}^{U} \int_{-\infty}^{\infty} h_u(t,\tau) x_u^{ul}(t-\tau) d\tau + z^{ul}(t). \tag{1}$$

$h_u(t,\tau) \in C^{M \times 1}$ represents a time-varying uplink channel impulse response from the user terminal u to the skywave communication base station, and $z^{ul}(t)$ represents a noise vector, wherein M elements each observe a white complex Gaussian process and have the same power spectral density. Analogously, $x_u^{dl}(t) \in C^{M \times 1}$ is defined as an analog baseband complex signal transmitted by the skywave communication base station to the user terminal u. In this case, the analog baseband complex signal received by the user terminal u may be represented as $$y_u^{dl}(t) = \sum_{u'=1}^{U} \int_{-\infty}^{\infty} [h_u(t,\tau)]^T x_{u'}^{dl}(t-\tau) d\tau + z_u^{dl}(t). \tag{2}$$

According to reciprocity of uplink and downlink channels in skywave TDD communication, $[h_u(t,\tau)]^T$ represents a time-varying downlink channel impulse response from the skywave communication base station to the user terminal u, which is reflected as a transpose of the uplink channel impulse response. An operator $[\;]^T$ represents a transpose operation, a superscript T represents a transpose of a matrix or a vector, and $z_u^{dl}(t)$ represents a white complex Gaussian process.

Since different propagation paths in the skywave communication are much different in propagation distance, the channel delay spread may reach a magnitude of millisecond. In the meantime, movements of the ionosphere and the user terminal may cause Doppler shifts of the channels. The skywave communication channel characteristic is related to day-night, season, weather, and positions of the skywave communication base station and the user terminal. Magnitudes of typical Doppler spreads induced by the ionosphere in environments of quiescent ionosphere, mild ionosphere, and disturbing ionosphere in mid-latitude regions are respectively 0.1 Hz, 0.5 Hz, and 1 Hz. In addition, modeling of Doppler spreads induced by movement of the user terminal is similar to that in the case of the terrestrial cellular communication. For example, in the case that the movement speed of the user terminal is 100 km/h, and the carrier is 16 MHz, the magnitude of the Doppler spread is 1.48 Hz. Generally, coherence time of the skywave communication channel is determined by the Doppler spread of the channel, and is far greater than a channel delay spread in typical scenarios. By adaptive selection of the OFDM modulation parameter and the signal frame structure, the OFDM modulation has been applied to the broadband skywave communication. Transmitting the skywave large-scale MIMO signal based on the OFDM modulation mode or the power efficiency improvement modulation mode includes: transmitting a downlink signal based on the OFDM modulation mode, and transmitting a skywave uplink signal based on the OFDM modulation mode or the power efficiency improvement modulation mode. The OFDM includes discrete Fourier transform OFDM.

In this embodiment, the OFDM modulation is considered in both skywave large-scale MIMO uplink and downlink signal transmissions. The number of carriers is marked as $N_c$, a length of a cyclic prefix (CP) is marked as $N_g$, and a system sampling interval is marked as $T_s$. The OFDM modulation parameter is adaptively selected by the skywave communication base station according to the real-time ionospheric channel characteristic. $T_c = N_c T_s$ is marked as lasting time of an OFDM symbol, and $T_g = N_g T_s$ is marked as lasting time of a CP. The time-frequency resources used for the skywave large-scale MIMO communication are OFDM modulation symbols and OFDM modulated sub-carriers. It is assumed that INT, sub-carriers are employed to transmit data, and indexes of the sub-carriers are a set $K=\{0,1,\ldots,N_v-1\}$. The remaining $N_c-N_v$ sub-carriers are defined as imaginary carriers, and serve as protective frequency bands of the skywave communication system, and signals on the sub-carriers are all defined as 0. $x_{u,l,k}^{ul}$ is defined as a transmit signal on a $l^{th}$ symbol of a $k^{th}$ sub-carrier of the user terminal u, and in this case, a transmit analog baseband complex signal including a CP on the $l^{th}$ symbol of the user terminal u may be represented as $$x_{u,\ell}^{ul}(t) = \sum_{k \in K=} x_{u,\ell,k}^{ul} e^{j2\pi k \Delta f t}, \qquad (3)$$

$$-T_g \le t - \ell(T_c + T_g) < T_c.$$

$$\Delta f = \frac{1}{T_c}$$

represents a spacing of the sub-carriers. Analogously, $x_{u,l,k}^{dl} \in C^{M \times 1}$ represents the signal transmitted by the skywave communication base station to symbol of the $k^{th}$ carrier of the user terminal u. The analog baseband complex signal including the CP transmitted by the skywave communication base station to the $l^{th}$ symbol of the user terminal u may be represented as $$x_{u,\ell}^{dl}(t) = \sum_{k \in K=} x_{u,\ell,k}^{dl} e^{j2\pi k \Delta f t}, \qquad (4)$$

$$-T_g \le t - \ell(T_c + T_g) < T_c.$$

A Fourier transform of $h_u(t, \tau)$ is defined as $\hat{h}_u(t,f)$, and in this case, a baseband demodulation signal on the $k^{th}$ sub-carrier of the $l^{th}$ symbol may be represented as $$y_{\ell,k}^{ul} = \sum_{u=1}^{U} h_{u,\ell,k} x_{u,\ell,k}^{ul} + z_{\ell,k}^{ul}. \qquad (5)$$

$h_{u,l,k} \in C^{M \times 1}$ represents an uplink channel frequency response on the $k^{th}$ sub-carrier of the symbol, which is represented as $$h_{u,l,k} = \hat{h}_u(l(T_c+T_g), k\Delta f) \qquad (6).$$

$z_{l,k}^{ul} \sim CN(0, \sigma_{l,k}^{ul} I_M)$ represents a complex Gaussian noise vector, and CN (a,B) represents cyclic symmetric complex Gaussian distribution with a mean value a and a square error B.

Analogously, the baseband demodulation signal on the $k^{th}$ sub-carrier of the $l^{th}$ symbol of the user terminal u may be represented as $$y_{u,\ell,k}^{dl} = \sum_{u'=1}^{U} h_{u,\ell,k}^T x_{u',\ell,k}^{dl} + z_{u,\ell,k}^{dl}. \qquad (7)$$

$h_{u,l,k}^T$ represents a downlink channel frequency response from the skywave communication base station to the $k^{th}$ sub-carrier of the symbol of the user terminal u, and $z_{u,l,k}^{dl} \sim CN(0, \sigma_{u,l,k}^{dl})$ represents complex Gaussian noise.

III. Channel Model

First, a skywave large-scale MIMO broadband communication antenna-domain channel is established. A broad-sense stationary uncorrelated scatter channel is considered. It is assumed that $P_u$ distinguishable paths are presented between the user terminal u and the skywave communication base station. A transmission delay of a pill path between the user terminal u and an $m^{th}$ antenna of the skywave communication base station may be represented as $$\tau_{u,p,m} = \tau_{u,p} + (m-1)\Delta\tau\Omega_{u,p} \qquad (8).$$

$$\Delta\tau = \frac{d}{c},$$

$\tau_{u,p}$ represents a transmission delay of the $p^{th}$ path between the user terminal u and a first antenna of the skywave communication base station, $\Omega_{u,p} = \cos\theta_{u,p}$ represents an angle cosine of the antenna array, and $\theta_{u,p}$ represents a downlink angle of departure or an uplink angle of arrival of the $p^{th}$ path of the user terminal u.

An angle spread is induced by scattering in the reflection of the signals via the ionosphere and the ground and by different angles of multi-path propagation. An orientation angle of arrival/departure may be different from an orientation of a large circle between the skywave communication base station and the user terminals. A typical orientation spread is 1*. However, an even greater angle spread may be observed in the environment of disturbing ionosphere. A pitch angle of arrival/departure is determined by a distance of the large circle and an ionosphere mode. In long-range skywave transmission, a pitch angle spread observed is small.

In the uplink, a time-varying channel impulse response between the user terminal u and the $m^{th}$ antenna of the skywave communication base station may be represented as $$h_{u,m}(t, \tau) = \sum_{v=1}^{P_v} \alpha_{u,p}(t) o^{-j2\pi f_c(m-1)\Delta\tau\Omega_{u,m}} \delta(\tau - \tau_{u,v,m}). \quad (9)$$

$j=\sqrt{-1}$ represents a pure imaginary number, and $\alpha_{u,p}(t)$ represents a random process of complex gain. Since the surface of the earth and the reflective ionosphere are both coarse, it may be assumed that the $p^{th}$ path includes $Q_p$ indistinguishable sub-paths, and these sub-paths have the same delay and angle of arrival/departure. Then, $\alpha_{u,p}(t)$ may be expressed as $$\alpha_{u,p}(t) = \sum_{q=1}^{Q_p} \beta_{u,p,q} e^{j\phi_{u,p,q}} e^{-j2\pi(f_c+v_{u,p,q})\tau_{u,p}} e^{j2\pi v_{u,p,q} t}. \quad (10)$$

$\beta_{u,p,q}$, $\phi_{u,p,q}$ and $u_{u,p,q}$ respectively represent a gain, an initial phase, and a Doppler frequency shift of a $q^{th}$ sub-path. It is assumed that $\theta_{u,p,q}$ is a random variable uniformly distributed in an interval $[0,2\pi]$. In the case that $Q_p$ goes to infinity, $\alpha_{u,p}(t)$ observes a zero mean value complex Gaussian random process, and experiences a Rayleigh fading.

For brevity, an uplink channel impulse response vector from the user terminal u to the skywave communication base station is represented as $$h_v(t, \tau) = \sum_{v=1}^{P_u} g_{u,p}(t, \tau) * g(\Omega, \tau). \quad (11)$$

* represents a convolution symbol, $$g_{u,p}(t,\tau) = \alpha_{u,p}(t)\delta(t-\tau_{u,p}) \quad (12),$$

$$g(\Omega,\tau) = [g_1(\Omega,\tau), \ldots, g_M(\Omega,\tau)]^T \quad (13),$$

and $$g_m(\Omega,\tau) = e^{-j2\pi f_c(m-1)\Delta\tau\Omega} \delta(\tau-(m-a)\Delta\tau\Omega) \quad (14)$$

Further, an antenna-domain uplink channel frequency response vector of the skywave large-scale MIMO broadband communication may be represented as $$h_{u,\ell,k} = \sum_{p=1}^{P_v} \alpha_{u,p}(\ell(T_c + T_g))e^{-j2\pi k\Delta f \tau_{u,p}} v(\Omega_{u,p}, k). \quad (15)$$

$$v(\Omega,k) = [1, e^{-j2\pi(f_c+k\Delta f)\Delta\tau\Omega}, \ldots, e^{-j2\pi(f_c+k\Delta f)(M-1)\Delta\tau\Omega}]^T \quad (16)$$

$v(\Omega, k)$ represents an array direction vector on the $k^{th}$ sub-carrier. It may be seen that the array direction vector $v(\Omega, k)$ varies along the sub-carrier. Then, based on the antenna-domain channel model (15), a statistical channel model is acquired by further using the sampled array direction vectors. This statistical channel model is expressed as a beam-domain channel model. In the expressions hereinafter, $\varphi_{u,p,l} = \alpha_{u,p}(l(T_c+T_g))$ is defined to simplify symbol representations.

The skywave communication base station selects a group of spatial angle sampling lattices which are uniform sampling lattices of cosines of angles 12. It is assumed that $\tilde{M} \geq M$ represents the number of sampled array direction vectors. A set constituted by all possible cosines of angles is represented as $$S \equiv S_{\tilde{1}} = \bigcup \ldots \bigcup S_{\tilde{M}} = (-1, 1],$$

wherein $$s_{\tilde{m}} = ((2\tilde{m} - 2 - \tilde{M}/\tilde{M}), (2\tilde{m} - \tilde{M})/\tilde{M}), 1 \leq \tilde{m} \leq \tilde{M}.$$

In addition, $\cup$ represents a union of set.

$P_u = \{\Omega_{u,1}, \ldots, \Omega_{u,P_u}\}$ is defined as a set of cosines of angles of the user terminal u. $\cap$ is defined as an intersection of set, and then $h_{u,l,k}$ may be modified as $$h_{u,\ell,k} = \sum_{\tilde{m}=1}^{\tilde{M}} \sum_{\Omega_{u,p} \in P_u \cap S_{\tilde{m}}} \varphi_{u,p,\ell} e^{-j2\pi k\Delta f \tau_{u,p}} v(\Omega_{u,p}, k). \quad (17)$$

It is defined that $$u_{\tilde{m}} = \frac{(2\tilde{m} - 1 - \tilde{M})}{\tilde{M}},$$

and a cosine of angle in a set $S_{\tilde{m}}$ may be approximated to $u_{\tilde{m}}$. Then, $h_{u,l,k}$ may be approximated to $$h_{u,f,k} = \sum_{\tilde{m}=1}^{\tilde{M}} \tilde{h}_{u,\ell,k,\tilde{m}} v(u_{\tilde{m}}, k). \quad (18)$$

$v(u_{\tilde{m}}, k)$ represents a sampled array direction vector, which varies along different signal frequencies or sub-carriers. Particularly, the array direction vector $v(u_{\tilde{m}}, k)$ is determined by the skywave communication base station according to a current signal frequency or sub-carrier index and an antenna spacing.

In addition, $$\tilde{h}_{u,\ell,k,\tilde{m}} = \sum_{\Omega_{u,p} \in P_u \cap S_{\tilde{m}}} \varphi_{u,p,\ell} e^{-j2\pi k\Delta f \tau_{u,p}}. \quad (19)$$

The above channel approximately gives n beam-domain-based channel representation. Since the sampled array direction vectors correspond to physical spatial beams and each of the vector direction vector corresponds to one beam. $\tilde{h}_{u,l,k,\tilde{m}}$ may be considered as a beam-domain communication element of the skywave large-scale MIMO broadband communication, which varies along different signal frequencies or sub-carriers k.

$\tilde{h}_{u,l,k} = [\tilde{h}_{u,l,k,1}, \ldots, \tilde{h}_{u,l,k,\tilde{M}}]^T \in C^{\tilde{M} \times 1}$ is defined as a beam-domain channel vector of the skywave large-scale MIMO broadband communication of the user terminal u on the $l^{th}$ symbol of the $k^{th}$ sub-carrier, wherein elements of the vector are independent random variables. Then, the matrix constituted by the array direction vectors sampled on the $k^{th}$ sub-carrier may be represented as $$V_k = [v(u_1,k), \ldots, v(u_{\tilde{M}},k)] \in C^{M \times \tilde{M}} \quad (20).$$

In this way, a conversion between the skywave large-scale MIMO broadband communication antenna-domain channel and the skywave large-scale MIMO broadband communication beam-domain channel, which is represented as $$h_{u,l,k} = V_k \tilde{h}_{u,l,k} \tag{21}$$

It is defined the statistical characterization of the skywave large-scale MIMO broadband communication beam-domain channel on the $l^{th}$ symbol of the $k^{th}$ sub-carrier is $$\omega_{u,l,k} = E\{\tilde{h}_{u,l,k} \odot \tilde{h}_{u,l,k}^*\} \in R^{M \times 1} \tag{22}$$

$E\{\cdot\}$ represents a mathematical expectation, $\odot$ represents a Hadamard product, and a superscript * represents a conjugate of a matrix or vector. An $\tilde{m}^{th}$ element of $\omega_{u,l,k}$ may be calculated as $$[w_{u,f,k}]_{\tilde{m}} = \sum_{\Omega_{u,p} \in P_u \cap S_{\tilde{m}}} E\{|\varphi_{u,p,l}|^2\} = \sum_{\Omega_{u,p} \in P_u \cap S_{\tilde{m}}} \sum_{q=1}^{Q_p} \beta_{u,p,q}^2. \tag{23}$$

A subscript $\tilde{m}$ represents an $\tilde{m}^{th}$ element of the vector, and $|\cdot|$ represents a modulus calculation operation. It may be seen that the statistical information or energy of the skywave large-scale MIMO broadband communication beam-domain channel is the same on all the signal frequencies or sub-carriers. $\omega_u = \omega_{u,l,k}$ may be simply marked as representing the statistical channel information.

Uplink MMSE Receiver and Downlink MMSE Pre-Coder

Without loss of generality, transmission on the symbol is only considered subsequently. For brevity, the subscript 1 is omitted in symbol marking. Prior to the skywave large-scale MIMO uplink and downlink transmissions, the skywave communication base station schedules users based on the statistical channel information of the OFDM sub-carrier domains used by the user terminals. Specifically, first a diagonal matrix $\Lambda_u$ is generated. Diagonal elements constitute a vector diag $(\Lambda_u) = \omega_u$, wherein diag $(\cdot)$ represents extracting the diagonal elements from the matrix and constituting the vector. It is assumed that $\Xi_{u,k}$ represents a matrix $E\{h_{u,k} h_{u,k}^H\}$ correlated to the antenna-domain channel of the skywave large-scale MIMO broadband communication, wherein a superscript H represents a conjugate transpose of the matrix or vector, and it may be calculated:

$$\Xi_{u,k} = V_k \Lambda_u V_k^H \tag{24}$$

A correlation of channel-related matrices between the user terminal u and the user terminal u' is further defined as $$\gamma_{u,u'} = \frac{1}{N_v} \sum_{k \in K} \frac{tr(\Xi_{u,k} \Xi_{u',k})}{\|\Xi_{u,k}\|_F \|\Xi_{u',k}\|_F}. \tag{25}$$

$tr(\cdot)$ represents a trace of the matrix, and $\|\cdot\|$ represents a Frobenius norm of the matrix. In skywave large-scale MIMO user scheduling, the user terminals with minimum correlation of user terminal channel-related matrices need to be selected to form a space division user group.

In the skywave large-scale MIMO uplink transmission, a receive signal vector of the skywave communication base station on the $k^{th}$ sub-carrier is expressed as $$y_k^{ul} = H_k x_k^{ul} + z_k^{ul} \tag{26}$$

$H_k = [h_{1,k}, \ldots, h_{U,k}] \in C^{M \times U}$ represents a skywave large-scale MIMO uplink channel matrix on the $k^{th}$ sub-carrier;

$x_k^{ul} = [x_{1,k}^{ul}, \ldots, x_{U,k}^{ul}]^T$, wherein a covariance matrix thereof satisfies $E\{x_k^{ul}(x_k^{ul})^H\} = q_{ul} I_U$, wherein $x_{u,k}^{ul}$ represents a transmit signal of the user terminal u and $q^{ul}$ represents an average transmit power of each of the user terminals; and $z_k^{ul} \sim CN(0, \sigma_{ul} I_M)$ represents a complex Gaussian noise vector.

$R_k \in C^{U \times M}$ is defined to represents a linear receiver, and a mean-square error of the receiver is defined as $$\varepsilon_k^{ul} = E\{\|x_k^{ul} - R_k y_k^{ul}\|^2\} \tag{27}$$

$\|\cdot\|$ represents a 2-norm. $G_k = H_k^H H_k$ and $$\rho^{ul} = \frac{q^{ul}}{\sigma^{ul}}$$

are defined. An uplink receiver of a minimum mean-square error is expressed as $$R_k^{mmse} = \left(G_k + \frac{1}{\rho^{ul}} I_U\right)^{-1} H_k^H. \tag{28}$$

In the skywave large-scale MIMO downlink transmission, a downlink receive signal vector of the U user terminals on the $k^{th}$ sub-carrier may be expressed as $$y_k^{dl} = H_k^T P_k x_k^{dl} + z_k^{dl} \tag{29}$$

$P_k$ represents a pre-coding matrix and satisfies a power constraint tr $(P_k^H P_k) \leq U$, $x_k^{dl} = [x_{1,k}^{dl}, \ldots, x_{U,k}^{dl}]^T$, wherein a covariance matrix thereof satisfies $E\{x_k^{dl}(x_k^{dl})^H\} = q^{dl} I_U$ wherein $x_{u,k}^{dl}$ represents a signal transmitted to the user terminal u, and $q^{dl}$ represents an average transmit power of each of the user terminals; and $z_k^{dl} \sim CN(0, \sigma^{dl} I_U)$ resents a complex Gaussian noise vector.

A mean-square error of pre-coding is defined as $$\varepsilon_k^{dl} = E\{\|x_k^{dl} - \zeta_k y_k^{dl}\|^2\} \tag{30}$$

$\zeta_k$ represents a real scaling factor. A downlink pre-coder of the minimum mean-square error is expressed as $$P_k^{mmse} = \frac{1}{\zeta_k^{mmse}} \left(\left(G_k + \frac{1}{\rho^{dl}} I_U\right)^{-1} H_k^H\right)^T \tag{31}$$

wherein $$\rho^{dl} = \frac{q^{dl}}{\sigma^{dl}},$$

wherein the value of $\zeta_k^{mmse}$ satisfies a power constraint $tr(P_k^{mmse}(P_k^{mmse})^H) = U$.

IV. Uplink Receiver and Downlink Pre-Coder Based on Polynomial Expansion

Since the matrix inversion operation in the uplink receiver and the downlink pre-coder in accordance with the minimum mean-square error criterion has a high complexity in calculation, it is considered that the matrix inversion operation is replaced by an approximate matrical polynomial. First, the uplink receiver based on the polynomial expansion may be represented as $$R_k^{pe} = \sum_{n=1}^{N} b_{k,n}^{u,i} G_k^{n-1} H_k^H, \qquad (32)$$

in which N≤U represents an order of the receiver, and $b_{k,n}^{ul}$ represents a coefficient of the polynomial expansion uplink receiver. A coefficient vector is further defined as $b_k^{ul} = [b_{k,1}^{ul}, \ldots, b_{k,N}^{ul}]^T \in \mathbb{C}^{N\times 1}$, and it is assumed that $B_k = H_k H_k^H$ and $$\mu_{k,n} = \frac{1}{M} tr(B_k^n).$$

It may be obtained:

$$b_k^{dl} = (\Phi_k^{ul})^{-1} a_k \qquad (33),$$

in which $\Phi_k^{ul} \in \mathbb{C}^{N\times N}$, $a_k \in \mathbb{C}^{N\times 1}$, and $$[\Phi_k^{ul}]_{i,j} = \mu_{k,i+j} + \frac{\mu_{k,i+j-1}}{\rho^{ul}}, \qquad (34)$$

and $$[a_k]_n = \mu_{k,n}. \qquad (35)$$

The subscript i,j represents an element of an row and a $j^{th}$ column of the matrix. Analogously, it is defined that $$b_k^{dl} = (\Phi_k^{dl})^{-1} a_k \qquad (36),$$

in which $$[\Phi_k^{dl}]_{i,j} = \mu_{k,i+j} + \frac{\mu_{k,i+j-1}}{\rho^{dl}}. \qquad (37)$$

An $n^{th}$ element of $b_k^{dl}$ is marked as $b_{k,n}^{dl}$, and in this case, a downlink pre-coder based on the polynomial expansion may be represented as $$P_k^{pe} = \frac{1}{\zeta_k^{pe}} \left( \sum_{n=1}^{N} b_{k,u}^{dl} G_k^{n-1} H_k^H \right)^I. \qquad (38)$$

The value of $\zeta_k^{pe}$ satisfies a power constraint $tr((P_k^{pe})^H P_k^{pe}) = U$.

V. Uplink Receiver and Downlink Pre-Coder Based on Deterministic-Equivalent Polynomial Expansion Since coefficient vectors $b_k^{ul}$ and $b_k^{dl}$ are calculated based on instantaneous channel $H_k$, once $H_k$ is changed, $b_k^{ul}$ and $b_k^{dl}$ need to be calculated again and updated. Frequency updating the coefficient may cause a huge calculation complexity. It is considered that $b_k^{ul}$ and $b_k^{dl}$ are calculated based on the statistical information of the skywave large-scale MIMO broadband communication beam-domain channel that slowing varies with time. In the case that the number of antennas of the skywave communication base station goes to infinity, the following equation is established:

$$\mu_{k,n} - E\{\mu_{k,n}\} \xrightarrow{M\to 0} 0. \qquad (39)$$

The expectation operation $E\{\mu_{k,n}\}$ generally needs a large number of Monte Carlo simulations, which also causes a huge calculation workload. For further reduction of the calculation complexity, that the deterministic equivalent of $E\{\mu_{k,n}\}$ is represented as $\bar{\mu}_{k,n}$ is considered, wherein calculation of $\bar{\mu}_{k,n}$ only needs the statistical information of the skywave large-scale MIMO broadband communication beam-domain channel that slowly varies with time.

For calculation of $\bar{\mu}_{k,n}$, it is defined that $\Theta \in \mathbb{C}^{M\times M}$, and $\eta_{u,k}(\Theta)$ represents $E\{h_{u,k}^H \Theta h_{u,k}\}$. It may be calculated:

$$\eta_{u,k}(\Theta) = \sum_{\tilde{m}=1}^{\tilde{M}} [\omega_u]_{\tilde{m}} [V_k^H \Theta V_k]_{\tilde{m},\tilde{m}}. \qquad (40)$$

In this embodiment, the deterministic equivalent of $b_k^{ul}$ is calculated according to the theory of large dimensional random matrices. In the case that the number of antennas of the skywave large-scale MIMO communication base station goes to infinity, it may be obtained:

$$\bar{\mu}_{k,n} - E\{\mu_{k,n}\} \xrightarrow{M\to 0} 0. \qquad (41)$$

$\bar{\mu}_{k,n}$ may be represented as $$\frac{1}{M} tr(\bar{B}_{k,n}),$$

and $\bar{B}_{k,n}$ may be obtained by the following recursion relationships:

$$\bar{B}_{k,n+1} = \sum_{j=0}^{n} \left( \sum_{u=1}^{U} \bar{\Psi}_{u,k,j} \Xi_{u,k} \right) \bar{B}_{k,n-j}, \qquad (42)$$

and $$\bar{\Psi}_{u,k,n+1} = \sum_{j=0}^{n} \eta_{u,k}(\bar{B}_{k,j}) \bar{\Psi}_{u,k,n-j}, \qquad (43)$$

in which $n \in N$, an initial value $\bar{B}_{k,0} = I_M$, and $\bar{\Psi}_{u,k,0} = 1$.

In the case that the number of antennas of the skywave large-scale MIMO communication base station is huge, $\bar{\mu}_{k,n}$ may be approximated $\mu_{k,n}$. It is defined that $\bar{\Phi}_k^{ul} \in \mathbb{C}^{N\times N}$, and $\bar{a}_k \in \mathbb{C}^{N\times 1}$ is $$[\bar{\Phi}_k^{ul}]_{i,j} = \bar{\mu}_{k,i+j} + \frac{\bar{\mu}_{k,i+j-1}}{\rho^{ul}}, \qquad (44)$$

and $$[\bar{a}_k]_n = \bar{\mu}_{k,n}; \qquad (45)$$

an approximate coefficient vector may be represented as $$\bar{b}_k^{ul} = (\bar{\Phi}_k^{ul})^{-1} \bar{a}_k \qquad (46).$$

An $n^{th}$ element of $\bar{b}_k^{ul}$ is marked as $\bar{b}_{k,n}^{ul}$, and in this case, an uplink receiver based on the deterministic-equivalent polynomial expansion may be represented as $$\overline{R}_k^{pe} = \sum_{n=1}^{N} \overline{b}_{k,n}^{ul} G_k^{n-1} H_k^H. \quad (47)$$

Analogously, it is defined that $$\overline{b}_k^{dl} = (\overline{\Phi}_k^{dl})^{-1} \overline{a}_k \quad (48),$$

in which $$[\overline{\Phi}_k^{dl}]_{i,j} = \overline{\pi}_{k,i+j} + \frac{\overline{\pi}_{k,i+j-1}}{\rho^{dl}}. \quad (49)$$

The $n^{th}$ element of $\overline{b}_k^{dl}$ is marked as $\overline{b}_{k,n}^{dl}$, and in this case, a downlink pre-coder based on the deterministic-equivalent polynomial expansion may be represented as $$\overline{P}_k^{pe} = \frac{1}{\zeta_k^{pe}} \left( \sum_{n=1}^{N} \overline{b}_{k,n}^{dl} G_k^{n-1} H_k^H \right)^T. \quad (50)$$

The value of $\zeta_k^{pe}$ satisfies a power constraint tr $((\overline{P}_k^{pe})^H (\overline{P}_k^{pe})) = U$.

VI. Implementation Effects

For better understanding of the technical solutions according to the present disclosure by a person skilled in the art, results of uplink/downlink traverses and rates of an MMSE receiver/pre-coder, a PE receiver/pre-coder, a low-complexity PE receiver/pre-coder according to the embodiments under system configurations are given hereinafter.

Figure 6:
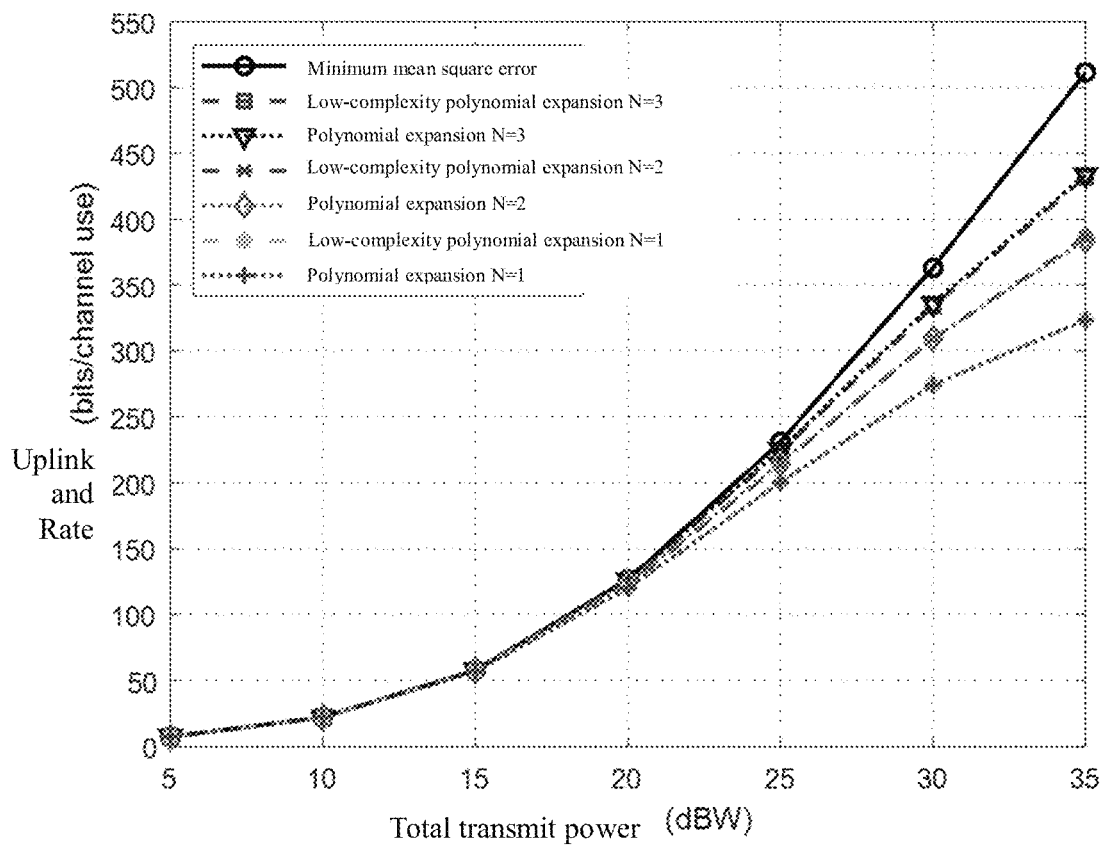
FIG. 6 is a schematic diagram of results of uplink traverse and rate of a skywave large-scale MIMO communication system in a transmission method based on an MMSE receiver, a PE receiver, and a low-complexity PE receiver.
Figure 7:
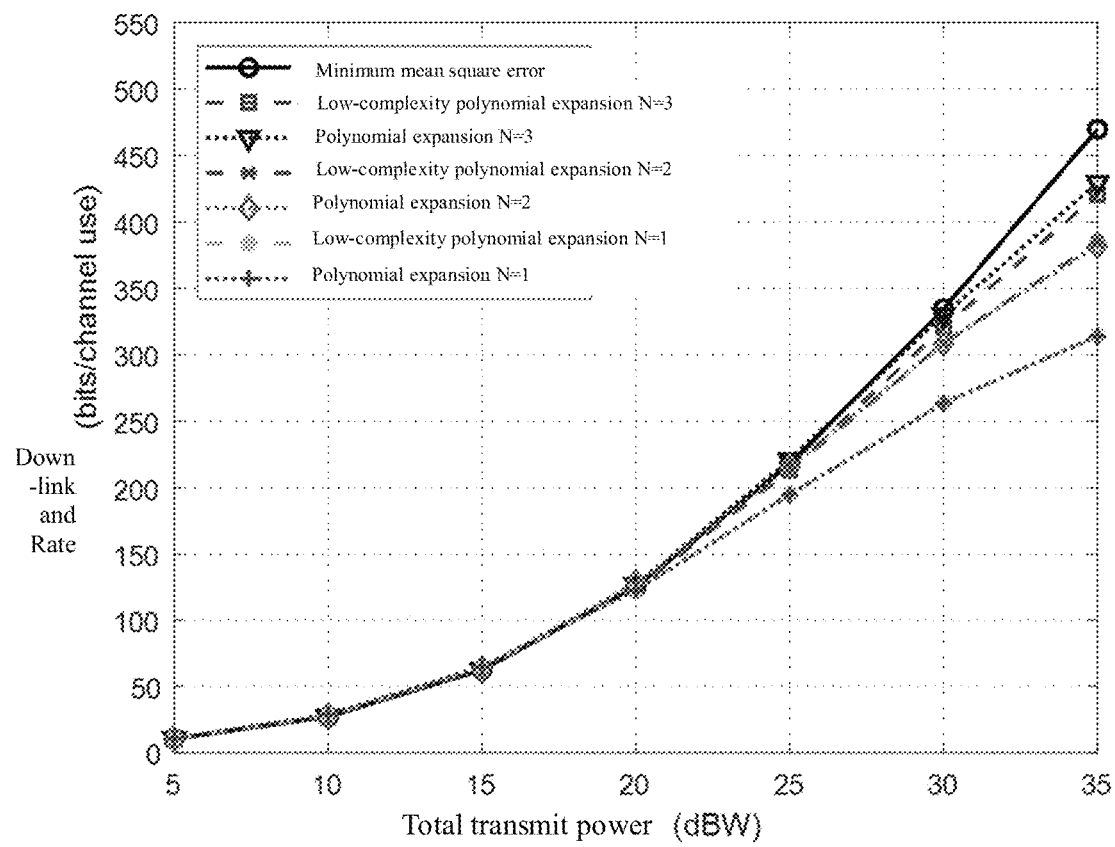
FIG. 7 is a schematic diagram of results of downlink traverse and rate of a skywave large-scale MIMO communication system in a transmission method based on an MMSE pre-coder, a PE pre-coder, and a low-complexity PE pre-coder.

Considering a skywave large-scale MIMO-OFDO communication system, configurations of system parameters are as follows: the carrier is $f_c$=16 MHz, the spacing of the antenna array of the skywave communication base station is d=9 m, the system bandwidth is B=384 kHz, the system sampling interval is $T_s$=1.95 μs, the spacing of the sub-carriers is Δf=250 Hz, the number of sub-carriers is $N_c$=2048, and the number of CPs is $N_g$=512. It is defined that the number of antennas of the skywave communication base station is M=256, the number of sampling beams is $\tilde{M}$=512, and the number of user terminals is U=96. It is defined that the total transmit power is a sum of transmit powers of U user terminals on the system bandwidth B=384 kHz, and the traverse and rate are averages of traverses and rates on all the effective sub-carriers. FIG. 6 illustrates comparison of results of uplink traverse and rate of an MMSE receiver, a PE receiver, a low-complexity PE receiver under different total transmit powers in the skywave large-scale MIMO communication system according to the embodiment. FIG. 7 illustrates comparison of results of downlink traverse and rate of an MMSE pre-coder, a PE pre-coder, a low-complexity PE pre-coder under different total transmit powers in the skywave large-scale MIMO communication system according to the embodiment. As illustrated in FIG. 6 and FIG. 7, the results the uplink and downlink traverses and rates of the system increase with increase of the total transmit power. Compared with the traditional short waveband skywave communication system, the sky wave large-scale MIMO communication according to this embodiment is capable of greatly improving the performance and rate of the system.

In the several embodiments according to the present disclosure, it should be understood that the disclosed method may be practiced in other manners within the spirit and scope of the present disclosure. The embodiments described above are merely exemplary ones, and shall not be considered as limiting the present disclosure. The specific content given herein is not intended to limit the present disclosure. For example, some features may be ignored, or not executed.

The technical means disclosed in the technical solution according to the present disclosure are not limited to those disclosed in the above embodiments, but further include technical solutions constituted by various combinations of the above technical features. It should be noted that persons of ordinary skill in the art would make several improvements and polishments without departing from the principle of the present disclosure, and such improvements and polishments shall be construed as falling within the protection scope of the present disclosure.

What is claimed is:

1. A skywave large-scale multiple-input and multiple-output (MIMO) communication method, comprising:
   constructing a skywave communication base station in a short waveband using a large-scale antenna array, skywave large-scale MIMO communication being carried out between the skywave communication base station and a user terminal within a coverage area by ionospheric reflection;
   determining, by the skywave communication base station, a spacing of the large-scale antenna array according to a maximum operating frequency, and communicating with the user terminal based on a time division duplex (TDD) communication mode, a skywave large-scale MIMO signal being transmitted based on an orthogonal frequency division multiplexing (OFDM) modulation mode or a power efficiency improvement modulation mode;
   selecting a communication carrier frequency within a short waveband range according to a real-time ionospheric channel characteristic, and adaptively selecting an OFDM modulation parameter and a signal frame structure; and
   scheduling, by the skywave communication base station, users within the coverage area according to statistical channel information of various user terminals to form a space division user group, wherein skywave large-scale MIMO signal transmission is carried out between different user groups and the skywave communication base station using different communication time-frequency resources, and skywave large-scale MIMO signal transmission is carried out between user terminals in the same user group and the skywave communication base station using the same time-frequency resource.

2. The skywave large-scale MIMO communication method according to claim 1, wherein the large-scale antenna array of the skywave communication base station is a linear array formed of antennas in the short waveband.

3. The skywave large-scale MIMO communication method according to claim 2, wherein the spacing of the large-scale antenna array of the skywave communication base station is a half wavelength corresponding to the maximum operating frequency or an approximately maximum operating frequency.

4. The skywave large-scale MIMO communication method according to claim 1, wherein the short waveband range is 1.6 MHz to 30 MHz.

5. The skywave large-scale MIMO communication method according to claim 1, wherein the communication carrier frequency is determined by a frequency selection system of the skywave communication base station and varies with season, day-night, weather, and the like external factors, and the skywave communication base station implements a frequency selection function by passive monitoring and active detection; wherein in the active detection, the skywave communication base station transmits a dedicated channel detection signal, implements dynamic frequency selection and interference detection using a received short-wave full-band signal, and selects a frequency point with less interference as a current operating carrier.

6. The skywave large-scale MIMO communication method according to claim 1, wherein in the skywave TDD communication mode, uplink and downlink transmissions are carried out using the same frequency band, and time for the uplink and downlink transmissions within one frequency band is adjusted according to actual needs.

7. The skywave large-scale MIMO communication method according to claim 1, wherein transmitting the skywave large-scale MIMO signal based on the OFDM modulation mode or the power efficiency improvement modulation mode comprises: transmitting a skywave large-scale MIMO downlink signal based on the OFDM modulation mode, and transmitting a skywave large-scale MIMO uplink signal based on the OFDM modulation mode or the power efficiency improvement modulation mode.

8. The skywave large-scale MIMO communication method according to claim 1, wherein in the skywave large-scale MIMO, the statistical channel information of the various user terminals used for scheduling the users is statistical channel information of OFDM sub-carrier domains used by the various user terminals.

9. The skywave large-scale MIMO communication method according to claim 1, wherein the time-frequency resources used for the skywave large-scale MIMO communication are OFDM modulation symbols and OFDM modulated sub-carriers.

10. The skywave large-scale MIMO communication method according to claim 1, wherein carrying out the skywave large-scale MIMO signal transmission between the user terminals in the same user group and the skywave communication base station using the same time-frequency resource comprises: transmitting and receiving, by the user terminals in the same user group, a signal on the same time-frequency resource; calculating, by the skywave communication base station, uplink receivers and downlink pre-coders of the user terminals based on channel information of the user terminals in the space division user group to carry out signal reception and transmission.

11. The skywave large-scale MIMO communication method according to claim 10, wherein the uplink receiver and the downlink pre-coder are calculated based on a minimum mean square error criterion or based on a polynomial expansion or based on a deterministic-equivalent polynomial expansion.

12. The skywave large-scale MIMO communication method according to claim 1, wherein the skywave large-scale MIMO communication comprises:
  a. synchronization: the skywave communication base station broadcasts a downlink synchronization signal, and the user terminals establish and maintain synchronization with the skywave communication base station using a received signal;
  b. channel detection: the user terminals in the skywave communication each transmit an uplink detection signal, and the skywave communication base station estimates channel status information of each of the user terminals based on the received detection signal;
  c. space division grouping: the skywave communication base station schedules the users based on the acquired user channel status information, and schedules several user groups that are in communication on the same time-frequency resource simultaneously within the coverage area;
  d. uplink transmission: the user terminals within the same user group simultaneously transmit a pilot signal and a data signal to the skywave communication base station; and the skywave communication base station estimates uplink instantaneous channel information or statistical channel information based on the uplink detection signal or the pilot signal, calculates uplink reception and processing vectors of the user terminals based on a minimum mean square error criterion or based on a polynomial expansion or based on a deterministic-equivalent polynomial expansion, and performs uplink signal reception and processing; and
  e. downlink transmission: the skywave communication base station acquires a downlink channel according to channel reciprocity of a TDD system, and calculates downlink pre-coding vectors of the user terminals within the user group based on the minimum mean square error criterion or based on the polynomial expansion or based on the deterministic-equivalent polynomial expansion, and transmits a user pilot signal and a data signal in a digital pre-coding domain; and the user terminal implements downlink channel estimation, data signal demodulation, decoding, and the like operation using the acquired downlink pilot signal, and restores a user signal transmitted by the base station.

13. A beam-domain statistical model of a skywave large-scale multiple-input and multiple-output (MIMO) broadband communication channel applicable to the method as defined in claim 1, wherein a skywave communication base station generates the beam-domain statistical model for the skywave large-scale MIMO broadband communication channel; and the skywave communication base station selects a group of spatial angle sampling lattices, and forms beam-domain statistical characterization of skywave large-scale broadband communication orthogonal frequency division multiplexing (OFDM) transmit sub-carrier-domain channels using corresponding array direction vectors; wherein each of the array direction vectors corresponds to one beam, and the number of array direction vectors or beams is greater than or equal to the number of antennas in an array; a matrix constituted by the array direction vectors implements conversion between a skywave large-scale MIMO broadband communication antenna-domain channel and a skywave large-scale MIMO broadband communication beam-domain channel, and varies along different signal frequencies or sub-carriers; and statistical information or energy of the skywave large-scale MIMO broadband communication beam-domain channel is the same on all the signal frequencies or sub-carriers.

14. The beam-domain statistical model of the skywave large-scale MIMO broadband communication channel according to claim 13, wherein the selected group of spatial angle sampling lattices are uniform sampling lattices of cosines of angles.

15. The beam-domain statistical model of the skywave large-scale MIMO broadband communication channel according to claim 13, wherein the array direction vector is determined by the skywave communication base station according to a current signal frequency or sub-carrier index and an antenna spacing.

16. The beam-domain statistical model of the skywave large-scale MIMO broadband communication channel according to claim 13, wherein with respect to the skywave large-scale MIMO broadband communication beam-domain statistical characterization, the matrix constituted by the array direction vectors is multiplied by a random vector with elements independent of each other to characterize the skywave large-scale MIMO broadband communication antenna-domain channel; wherein the random vector is a vector of the skywave large-scale MIMO broadband communication beam-domain channel.

17. A skywave large-scale multiple-input and multiple-output (MIMO) communication system applicable to the method as defined in claim 1, comprising: a skywave communication base station and a large number of user terminals; wherein the skywave communication base station configures a short waveband large-scale antenna array to carry out skywave large-scale MIMO communication between the skywave communication base station and a user terminal within a same coverage area by ionospheric reflection; the skywave communication base station determines a spacing of the large-scale antenna array according to a maximum operating frequency, and communicates with the user terminal based on a time division duplex (TDD) communication mode, a skywave large-scale MIMO signal being transmitted based on an orthogonal frequency division multiplexing (OFDM) modulation mode or a power efficiency improvement modulation mode; the skywave communication base station selects a communication carrier frequency within a short waveband range according to a real-time ionospheric channel characteristic, and adaptively selects an OFDM modulation parameter and a signal frame structure; and the skywave communication base station schedules users within the coverage area according to statistical channel information of various user terminals to form a space division user group, wherein skywave large-scale MIMO signal transmission is carried out between different user groups and the skywave communication base station using different communication time-frequency resources, and skywave large-scale MIMO signal transmission is carried out between user terminals in the same user group and the skywave communication base station using the same time-frequency resource.

18. The skywave large-scale MIMO communication system according to claim 17, wherein the skywave communication base station comprises a frequency selection unit, a baseband processing unit, a radio frequency unit, a large-scale antenna array; wherein the baseband processing unit comprises:
  an analog-to-digital (A/D) conversion and digital down conversion module, configured for skywave large-scale MIMO uplink transmission; wherein the A/D conversion module is configured to perform radio frequency sampling in the whole short waveband, and convert a broadband analog signal to a digital signal; wherein the digital down conversion module is configured to down convert the digital signal output by the A/D conversion module to a baseband by digital processing to acquire a digital baseband signal;
  a digital baseband processing and control module, configured to, in the skywave large-scale MIMO uplink transmission, perform OFDM demodulation, joint receive multiple user received signals, and restore a transmit signal of each of the user terminals; and perform multiple user pre-coding transmission, generate the transmit signal of each of the user terminals, and perform OFDM modulation; wherein the control module is configured to perform space division user scheduling to form a space division user group and perform other controls in the communication; and
  a digital up conversion and digital-to-analog (D/A) conversion module, configured for skywave large-scale MIMO downlink transmission; wherein the digital up conversion module is configured to modulate the baseband signal to a radio frequency by digital processing; and the D/A conversion module is configured to convert a digital transmit signal generated by the up conversion module to an analog signal; wherein
the frequency selection unit of the skywave communication base station implements frequency selection by passive monitoring and active detection; wherein in the active detection, a dedicated channel detection signal is transmitted, dynamic frequency selection and interference detection are implemented using a received shortwave full-band signal, and a frequency point with less interference is selected as a current operating carrier; and
the large-scale antenna array of the skywave communication base station is an antenna array constituted by short waveband antenna units, wherein a spacing of the antenna units is a half wavelength corresponding to the maximum operating frequency, and the antenna array is in a linear form or a form facilitating deployment of the antenna units.

19. The skywave large-scale MIMO communication system according to claim 17, wherein the user terminal comprises a baseband processing unit, a radio frequency unit, and an antenna; wherein the baseband processing unit comprises:
  an analog-to-digital (A/D) conversion and digital down conversion module, configured for skywave large-scale MIMO downlink transmission; wherein the A/D conversion module is configured to convert a received analog signal to a digital signal; and the digital down conversion module is configured to down convert the digital signal output by the A/D conversion module to a baseband by digital processing to acquire a digital baseband signal;
  a digital baseband processing and control module, configured to implement downlink channel estimation, perform OFDM demodulation, and restore a data signal transmitted by the base station in the skywave large-scale MIMO downlink transmission; and generate a digital transmit signal and perform OFDM modulation in the skywave large-scale MIMO uplink transmission; and
  a digital up conversion module and D/A conversion module, configured for the skywave large-scale MIMO uplink transmission; wherein the D/A conversion module is configured to convert a digital signal to an analog signal; and the digital up conversion module is configured to modulate a digital baseband signal to a radio frequency by digital processing.

20. The skywave large-scale MIMO communication system according to claim 17, wherein the short waveband range is 1.6 MHz to 30 MHz.

21. The skywave large-scale MIMO communication system according to claim 17, wherein in the skywave TDD communication mode, uplink and downlink transmissions are carried out using the same frequency band, and time for the uplink and downlink transmissions within one frequency band is adjusted according to actual needs.

22. The skywave large-scale MIMO communication system according to claim 17, wherein transmitting the skywave large-scale MIMO signal based on the OFDM modulation mode or the power efficiency improvement modulation mode comprises: transmitting a skywave large-scale MIMO downlink signal based on the OFDM modulation mode, and transmitting a skywave large-scale MIMO uplink signal based on the OFDM modulation mode or the power efficiency improvement modulation mode.

23. The skywave large-scale MIMO communication system according to claim 17, wherein the statistical channel information of the various user terminals used for scheduling the users is statistical channel information of OFDM sub-carrier domains used by the various user terminals.

24. The skywave large-scale MIMO communication system according to claim 17, wherein the time-frequency resources used for the skywave large-scale MIMO communication are OFDM modulation symbols and OFDM modulated sub-carriers.

25. The skywave large-scale MIMO communication system according to claim 17, wherein carrying out the skywave large-scale MIMO signal transmission between the user terminals in the same user group and the skywave communication base station using the same time-frequency resource comprises: transmitting and receiving, by the user terminals in the same user group, a signal on the same time-frequency resource; calculating, by the skywave communication base station, uplink receivers and downlink pre-coders of the user terminals based on channel information of the user terminals in the space division user group to carry out signal reception and transmission.

26. The skywave large-scale MIMO communication system according to claim 25, wherein the uplink receiver and the downlink pre-coder are calculated based on a minimum mean square error criterion or based on a polynomial expansion or based on a deterministic-equivalent polynomial expansion; the uplink receiver comprises a minimum mean square error receiver or a polynomial expansion receiver or a low-complexity polynomial expansion receiver; and the downlink pre-coder comprises a minimum mean square error pre-coder or a polynomial expansion pre-coder or a low-complexity polynomial expansion pre-coder.

* * * * *